(12) United States Patent
Quinquis et al.

(10) Patent No.: US 7,733,877 B2
(45) Date of Patent: Jun. 8, 2010

(54) METHOD FOR TRANSPORTING VARIABLE-LENGTH PACKETS IN TEMPORAL CIRCUIT FRAMES

(75) Inventors: Jean-Paul Quinquis, Perros-Guirec (FR); Jean-Yves Cochennec, Trebeurden (FR); Olivier Roussel, Pleumeur Bodou (FR); Thierry Houdoin, Pleumeur Bodou (FR)

(73) Assignee: France Telecom, Paris (FR)

( * ) Notice: Subject to any disclaimer, the term of this patent is extended or adjusted under 35 U.S.C. 154(b) by 1541 days.

(21) Appl. No.: 10/480,716

(22) PCT Filed: Jun. 4, 2002

(86) PCT No.: PCT/FR02/01901

§ 371 (c)(1),
(2), (4) Date: Jul. 2, 2004

(87) PCT Pub. No.: WO02/101999

PCT Pub. Date: Dec. 19, 2002

(65) Prior Publication Data

US 2004/0240448 A1 Dec. 2, 2004

(30) Foreign Application Priority Data

Jun. 12, 2001 (FR) .................... 01 07765

(51) Int. Cl.
*H04L 12/66* (2006.01)
*H04L 12/28* (2006.01)
*H04J 3/24* (2006.01)

(52) U.S. Cl. ............. 370/395.64; 370/355; 370/395.31; 370/473; 370/474

(58) Field of Classification Search ................ 370/473, 370/474, 395.1, 397, 399, 395.2, 395.21, 370/395.3, 395.31, 395.6, 395.64, 354, 355, 370/356

See application file for complete search history.

(56) References Cited

U.S. PATENT DOCUMENTS

| | | | | |
|---|---|---|---|---|
| 5,933,412 A | * | 8/1999 | Choudhury et al. | 370/218 |
| 6,229,821 B1 | * | 5/2001 | Bharucha et al. | 370/471 |
| 6,349,097 B1 | * | 2/2002 | Smith | 370/390 |
| 6,597,697 B1 | * | 7/2003 | Petersen | 370/395.64 |
| 6,600,746 B1 | * | 7/2003 | Petersen | 370/394 |
| 2001/0030966 A1 | * | 10/2001 | Choi | 370/395 |

* cited by examiner

*Primary Examiner*—Daniel J Ryman
*Assistant Examiner*—Thinh D Tran
(74) *Attorney, Agent, or Firm*—David D. Brush; Westman, Champlin & Kelly P.A.

(57) ABSTRACT

A procedure is provided for transmitting packets of variable length, such as AAL2 packets and permitting the transmission of cells such as ATM cells, in time-division circuits such as E1/T1 frames, each divided into a number of time slots, each occupied by an eight-bit byte. The consecutive eight-bit bytes of each packet of variable length and of each cell are located in the slots of consecutive time of at least one group of time slots of the frames. The first eight-bit byte of a packet or a cell is placed at a time slot marked by a pointer occupying a specific time slot of the corresponding group of time slots.

21 Claims, 6 Drawing Sheets

Fig. 3

| | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | IT Rank |
|---|---|---|---|---|---|---|---|---|---|---|---|---|---|---|---|---|---|---|---|---|---|---|---|---|---|---|---|---|---|---|---|
| 1 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | Rank in the Group |
| 2 | | | | ▓ | | | | | | | | | | | | | | | | | | | | | | | | | | | Frame n |
| 13 | | | | | | | | | | | | | | | | | | | | | | | | | | | | | | | Frame n+1 |
| 28 | | | | | | | | | | | | | | | | | | | | | | | | | | | | | ▓ | | Frame n+2 |
| 15 | | | ▓ | | | | | | | | | | | | | | | | | | | | | | | | | | | | Frame n+3 |
| 0 | | | | | | | | | | | | | | | | | | | | | | | | | | | | | | | Frame n+4 |
| 19 | | | | | | | | | | | | | | | | | | | | | | | | | | | | | | | Frame n+5 |
| 31 | | | ▓ | | | | | | | | | | | ▓ | ▓ | ▓ | | | | | | | | | | | | | | | Frame n+6 |
| 0 | | | | ▓ | | | | | | | | | | | | | | | | | | ▓ | ▓ | ▓ | | | | | | | Frame n+7 |
| 30 | | | | | | | | | | | | | | | | | | | | | | | | | | | | | | | Frame n+8 |
| 2 | | | | | | ▓ | | | | | | | | | | | | | | | | | | | | | | | | | Frame n+9 |

Fig. 4

| 1 | 2 | 3 | 4 | 5 | 6 | 7 | 8 | 9 | 10 | 11 | 12 | 13 | 14 | 15 | 17 | 18 | 19 | 20 | 21 | 22 | 23 | 24 | 25 | 26 | 27 | 28 | 29 | 30 | 31 | IT Rank |
|---|---|---|---|---|---|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | | | | | | 14 | 15 | 16 | 17 | | | | | | | Rank in the Group |
| | 2 | | | | | | | | | | | | | | | | | | | | | | | | | | | | | Frame n |
| | 31 | | | | | | | | | | | | | | | | | | | | | | | | | | | | | Frame n+1 |
| | 1 | | | | | | | | | | | | | | | | | | | | | | | | | | | | | Frame n+2 |
| | 11 | | | | | | | | | | | | | | | | | | | | | | | | | | | | | Frame n+3 |
| | 14 | | | | | | | | | | | | | | | | | | | | | | | | | | | | | Frame n+4 |
| | 31 | | | | | | | | | | | | | | | | | | | | | | | | | | | | | Frame n+5 |
| | 0 | | | | | | | | | | | | | | | | | | | | | | | | | | | | | Frame n+6 |
| | 11 | | | | | | | | | | | | | | | | | | | | | | | | | | | | | Frame n+7 |

SG1 spans columns 4–17; SG2 spans columns 22–26.

METHOD FOR TRANSPORTING VARIABLE-LENGTH PACKETS IN TEMPORAL CIRCUIT FRAMES

CROSS-REFERENCE TO RELATED APPLICATION

This Application is a Section 371 National Stage Application of International Application No. PCT/FR02/01901, filed Jun. 4, 2002 and published as WO 02/101999A1 on Dec. 19, 2002, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

This invention has to do with a procedure for transmitting variable length packets, such as AAL2 packets, and, possibly, cells such as ATM cells in time-division circuit frames, such as E1/T1 frames, each occupied by a number of time slots each occupied by an eight-bit byte. More specifically, the variable length packets are packets which comply with the AAL2 protocol (ITU recommendation I363.2), while the time-division circuit frames are, for example, of the type which are defined in the ITU G.703 and G.704 recommendations and which are generally called E1 or T1 frames, or even of the type also called SDSL or HDSL.

The transmission of information complying with the AAL2 protocol (ITU recommendations I.363.2, I366.1 and I366.2) and the implementation of the associated signaling (ITU recommendation Q.2630.2) are recommended or planned for in various communications networks, the best-known of which is presently the access network for 3$^{rd}$ generation cell phone known as UTRAN (UMTS Terrestrial Radio Access Network). The use of this AAL2 protocol on an ATM cell access network was definitively adopted by the 3GPP standards organization for the UTRAN 1999 (R99) version; this version is currently called R3. The present invention is thus applicable to RNC mobile network controller architectures and in base stations called node B of an UTRAN access network. This invention's field of application may, moreover, be situated on the periphery of networks when the access calls for existing connections of the circuit type. Currently, consideration is being given to the idea of connecting the Node B base stations to concentrators or RNC mobile network controllers, particularly in rural zones.

Other fields of application may also be considered, such as, for example, voice transmission on ASDL or the connection of PABX through an ATM transmission network by using the "trunking" function defined in the ITU SSCS I.366.2 layer.

BACKGROUND OF THE DISCLOSURE

Below, there is a reminder of the principles governing the so-called AAL2 transmission protocol, described in the three ITU recommendations: I363.2, I366.1 and I366.2. This transmission protocol was defined for the purpose of avoiding the time problem involved in the assembly time of an ATM cell which is becoming critical for low rates. In fact, at 16 kbit/s, the assembly time amounts to 24 ms for the complete filling of the ATM cell. The solution selected was to multiplex the stream of several communications in a single ATM cell, using a packet information structure, called minicells or also CPS packets. This transmission method makes up the lower part of the protocol called the CPS (Common Part Sublayer). The indispensable adaptation functions are located above the CPS in the sublayers called SSCS (Service Specific Convergence Sublayer). The first, the SSCS segmentation sublayer is described in the ITU recommendation I.366.1 and is intended for the transmission of data units containing a significant number of bytes. The second, the SSCS trunking sublayer for real time is described in the ITU recommendation I.366.2.

A sequence of AAL2 packets is guaranteed on each AAL2 channel, but the service supplied by the CPS sublayer is a non-assured type, meaning that the missing packets (for example as a result of the loss of ATM cells transmitting them) are not replaced by retransmission at this level.

In FIG. 1a, there is a representation of the AAL2 packets of the CPS layer of the AAL2 protocol, as specified in the ITU 1.363.2 recommendation. The AAL2 packets have a 3-byte H_CPS header and a variable length P_CPS useable portion containing user information. By default, this length is limited to 45 bytes. As can be seen in FIG. 1a, the H_CPS header is made up in the following manner:

a CID connection identification field which is an 8-bit field and which allows the AAL2 connection to be identified, a field, of LI length which is a 6-bit field and which codes the length of the useable portion of the packet in such a way that LI+1 is equal to the number of bytes, a 5-bit user-to-user information (UUI) field, an HEC field which is a 5-bit field for protection against header errors.

The AAL2 packets are generally transmitted by means of ATM cells.

There is a description below of the considerations with respect to the transmission of ATM cells on the E1/T1 type framed media. They are the subject of the ITU Recommendation G.804 entitled: "ATM Cell Mapping into Plesichronous Digital Hierarchy" in the case of complete use of the offered band, that is to say, the frame's 30 time slots—TI. Currently, they are implanted in specific ATM switching modules.

A time-division circuit frame such as the one addressed by recommendation G.704 is divided into 32 time slots each occupied by a byte. In this context, it is deemed that only slots 1 to 15 and 17 to 31 transmit user data. A frame has a length of 125 .mu.s, and the flow of data transmitted by each TI slot is limited to 64 kb/s. By regrouping the TI time slots, it is possible to allow the information to flow at N times 64 kb/s, i.e., 2,048 kb/s if one takes into consideration the 32 TI time slots, but 1,920 kb/s if one takes into consideration the 30 time slots used for the transmission of user data.

Each byte of an ATM cell is within a single time slot TI. There is no relation between the beginning of a frame and the beginning of an ATM cell. This is because the number of bytes in an ATM cell is different from that of a circuit frame.

Figures 2, 7:
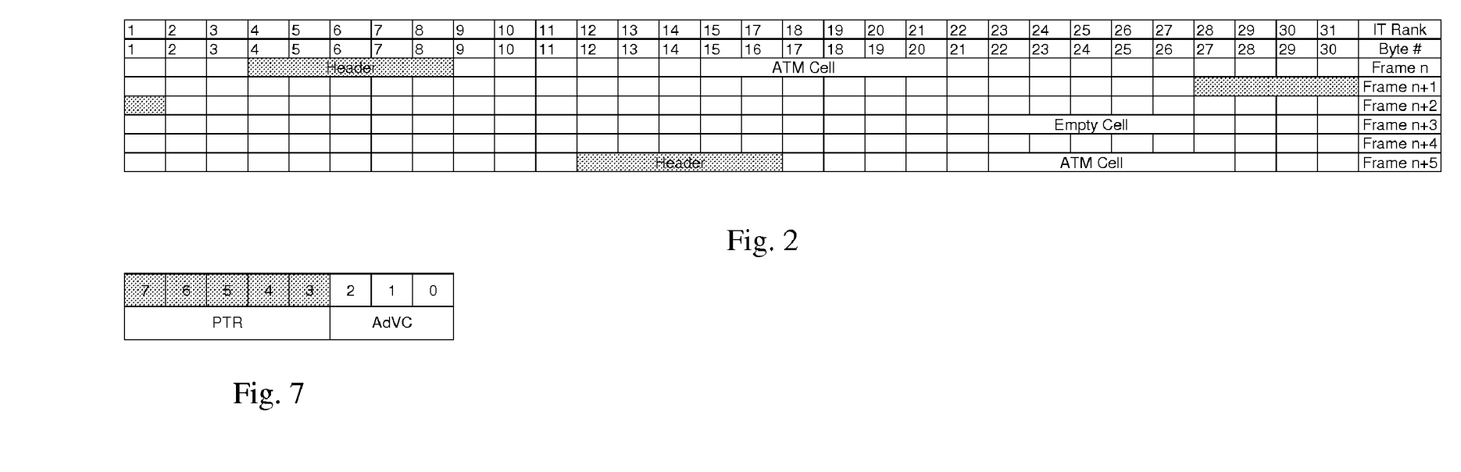
FIG. 2 is a diagram-illustrating the multiplexing of ATM cells on the structure of an E1 type frame with time-division circuits which uses all the time slots of the above-mentioned frames.
FIG. 7 is a diagram the format of the checking eight-bit byte which is used for the insertion of the AAL2 packets as set forth by the invention.

FIG. 2 represents an example of ATM cell multiplexing on a frame structure such as the one which has just been described. The various frames are represented in stacks and numbered "frame n", "frame n+1", etc. They follow each other in this time-division order. Each time slot is referenced by its rank and by the number of eight-bit bytes used for the transmission of the corresponding data. This representation only has 30 TI time slots which are used (the number of eight-bit bytes thus vary between 1 and 30) and thus, not the time slots of the 0 to 16 ranking which are used for functions other than data transmission.

It is pointed out here that the ATM cells are packets of a length fixed at 53 bytes, of which 5 are assigned to the header. In FIG. 2, the eight-bit bytes of the ATM cells which are not empty are represented by a series of squares, each corresponding to a time slot in a frame. The headers of these cells are grayed out. With respect to the empty cells, they are not represented as squares (they are not partitioned).

One may note that the cells are consecutive inside each frame.

In order to allow for the transmission of both packet type and circuit type traffics on the same media, allowance was made for the use of only a single portion of the TI time slots for the transmission of the user data. This use was described in a specifications document produced by the ATM Forum and entitled "ATM on Fractional E1/T1: AF-PHY-0130.00" dated August 1999, and it consists of assigning, for the transmission of ATM cells, N slots at 64 kb/s among the frame's 30 possible time slots IT; the IT time slots which are not used for this purpose can then, in a traditional mariner, be used for the transmission of data in circuit mode, for example, telephone communications.

Figure 3:
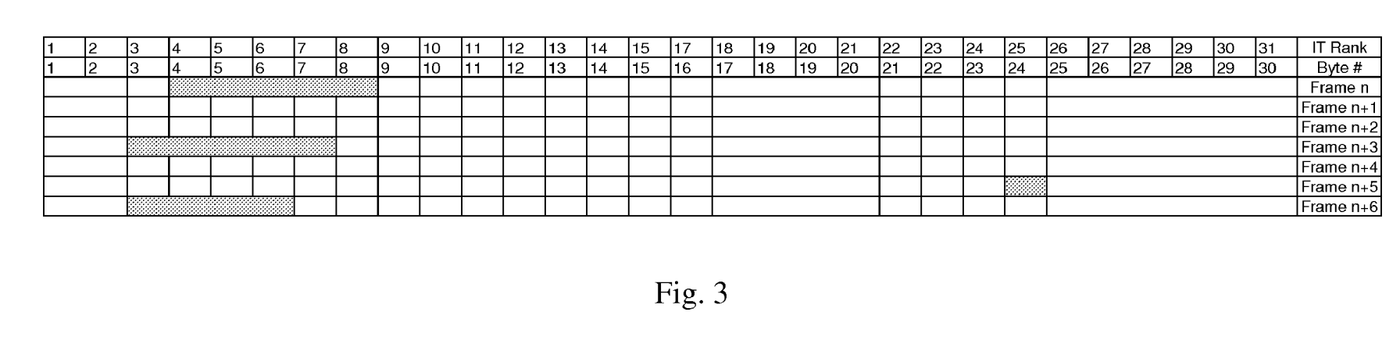
FIG. 3 is a diagram illustrating the multiplexing of ATM cells on the structure of an E1 type frame with time-division circuits which only partially uses all the time slots of the above-mentioned frames.

In FIG. 3, only a fraction of the time slots is allocated to ATM transmissions, these time slots TI being ranked in each frame between, on the one hand, 3 and 16, and 21 and 24 on the other. The time slots TI which are unused are represented without partitions. The number of eight-bit bytes used is included here between 1 and 18.

It is perfectly possible to transmit AAL2 packets, as described above, carried by ATM cells, themselves carried in time-division frames, such as those which are also described above. A frame of the E1/T1 type is, in this case, transparent to the cells' content. At the receiving end of the E1 connection, the ATM cells are first extracted for the time-division frame, then the AAL2 packets are extracted for the ATM cells to be reassembled. In a symmetrical manner, at the transmission extremity, the AAL2 packets are inserted into the ATM cells, which are then inserted into the time-division frame and thus transmitted.

The drawback to this solution is that the relationship between the number of useable bytes and the number of bytes transmitted over the connection is not very favorable in terms of efficiency. In fact, the 5 eight-bit bytes of the ATM cell headers added to a very variable number of padding eight-bit bytes associated with the multiplexing of mini-cells are so many time slots IT that they may be considered as lost with respect to the user data.

WO-A-00/59261 and EP-A-874 530 offer solutions to this specific problem.

In fact, the first involves a process for the transmission of mini-cells in a channel, E1 or T1 type, for example, made up of a number of multiframes, each multiframe containing, itself, several time slots. This process is set up in such a way that the transmission of these mini-cells does not pass through the ATM layer. In other terms, the heading of these ATM cells is suppressed and the mini-cells are directly transmitted to the E1 or T1 type frames. Nevertheless, this process necessitates the insertion of a starting eight-bit byte in the first time slot of each multiframe, the above-mentioned starting eight-bit byte containing a sequence number field, used to contain the number of multiframes.

Insofar as the EP-A-874 530 document is concerned, it sets forth the transmission of AAL2 type mini-cells to T1 type frames. To do so, the ATM layer is eliminated. There also, a six-bit pointer is used to define the starting location of the frame's next packet.

SUMMARY

A transmission method pursuant to an embodiment of the invention is of the type in which the consecutive eight-bit bytes of each variable length packet and of each cell are located in consecutive time slots of at least one group of time slots of the above-mentioned frames, the first eight-bit byte of a packet or a cell being located at a time slot marked by a pointer occupying a specific time slot of the above-mentioned group of the corresponding time slot.

It might also be interesting to be able to differentiate the virtual circuits to which the transmitted packets or cells might belong, according to the type of transmission which they allow. For example, it might be interesting to differentiate the virtual circuits on the basis of whether they allow voice transmission by means of AAL2 packets, data transmission, also by means of AAL2 packets, ATM cell transmission, transmission of control signaling information by means of AAL5 packets contained in ATM cells, etc.

To do so, an embodiment of the invention is characterized by the fact that each pointer is associated with a virtual circuit address defining a virtual circuit for the transmission of the given package or given cell directed by the given pointer, as well as the packet or packets or cells in the time slots of the frame belonging to the same group of time slots as the given packet or the given cell. For example, a given pointer and a given virtual circuit address are made up by the bits of the same eight-bit byte.

Pursuant to another embodiment of the invention's characteristics, a given pointer occupies the first time slot of the group of corresponding time slots. Its best value is the ranking minus one in the group of the first eight-bit byte of the heading of a packet, or, if the frame is partially empty and does not have a header or complete packet header, its value is the ranking in the group of the first empty eight-bit byte minus one. Moreover its value is zero when the first eight-bit byte of the given packet or given cell is located in the time slot which directly follows the one assigned to the given pointer. Its value is equal to a specific value when the time slots of the corresponding groups are empty, a specific value which is, for example, equal to the number of time slots which each frame has. Also, the pointer's value is equal to a specific value when all the group's time slots are occupied by the eight-bit bytes of a packet or cell, the heading of which is located in the preceding frame. This specific value is, for example, equal to the number of time slots contained in each frame minus one.

For the transmission of the given packet and the given cells, each frame may contain several groups of time slots. But, it may only contain a single group of time slots, which either occupies all the available time slots of each frame, or which only partially occupies the available time slots of each frame.

The given group or each group may also be subdivided in non-consecutive subgroups of time slots.

An embodiment of the present invention also deals with connection end equipment for the transmission of variable length packets such as AAL2 packets and, possibly, cells such as ATM cells, by means of virtual circuit frames, using a transmission method, as described above. Moreover, this equipment is designed to process the given packets in relation to the cells identified by a virtual path identifier and a virtual circuit identifier.

According to the present invention, it contains a table of correspondence between the virtual circuit address of the given packets and the identifiers of the virtual path and virtual circuit of the given cells.

For example, this equipment could be a multiplexer/demultiplexer containing, on the demultiplexer side, a number of ports for transmission connections by virtual circuit frames, and, on the multiplexer side, a port for transmission connectors by means of ATM cells.

But it can also be a multiplexer/demultiplexer having, on the demultiplexed side, a number of bi-directional ports for communication connections using virtual circuit frames and, on the demultiplexed side, a bi-directional port for transmission connections using virtual circuit frames.

According to another one of the inventions characteristics, this equipment has the ability to translate connection addresses carried by the variable length packets, so as to concentrate the flow of traffic on the multiplexed side.

The virtual path and virtual circuit identifiers are allocated on the basis of the type of connection involved.

Finally, an embodiment of the present invention also has to do with the frames of virtual time-division circuit frames, each divided into a number of time slots, each occupied by an eight-bit byte, which are characterized by the fact that they are intended for the transmission of variable length packets, such as AAL2 packets, and, possibly, cells such as the ATM cells, using a transmission process, as described above.

BRIEF DESCRIPTION OF THE DRAWINGS

The above-mentioned characteristics of the invention, as well as others, shall be made clearer by reading the following description of an embodiment, the above-mentioned description being given with the help of the attached drawings, among which are.

DETAILED DESCRIPTION OF ILLUSTRATIVE EMBODIMENTS

Figure 4:
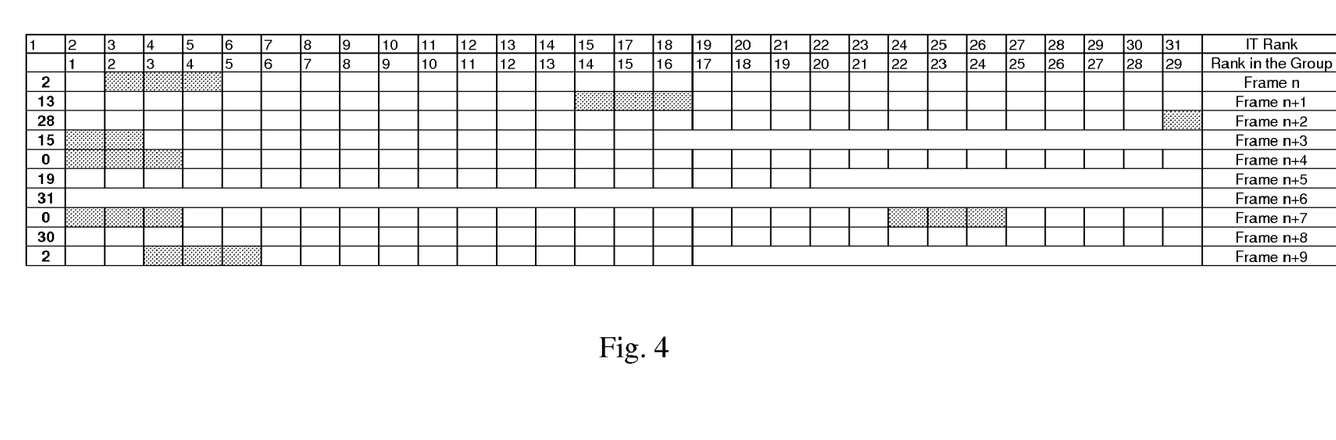
FIG. 4 is a diagram illustrating the multiplexing of AAL2 packets on E1 type frames with time-division circuits according to this invention, using all the time slots of the above-mentioned frames.

FIG. 4 is the representation of an example of the multiplexing of AAL2 packets directly into the time slots TI of a time-division frame, for example, of the E1/T1 type, in accordance with the process of an embodiment of this invention and this, by using all the available time slots TI in each frame (all the time slots with the exception of slots of rank 0 and 16, used for other purposes). Taken together, these time slots form what is called in the present description a group, specifically a group of used time slots. The headings of three eight-bit bytes of each AAL2 packet have been grayed out, the other eight-bit bytes are portioned off from each other. The empty eight-bit bytes are not, on the other hand, portioned off.

Figure 1:
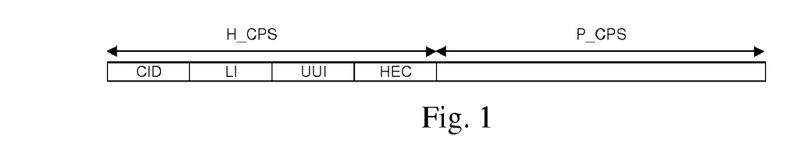
FIG. 1 is a diagram showing the format of an AAL2 packet.

It should be pointed out that the AAL2 packets have the format shown in FIG. 1 and that, consequently, their headings include, among other things, a connection identifier (CID).

A specific time slot of each group of used slots, in this case that of rank 1 of the group, is equipped with a PTR pointer, indicating the time slot which contains the heading of the first AAL2 packet contained in the group of time slots used. The value given to this pointer is, for example, the rank in the group of slots used of the indicated slot minus one.

In FIG. 4, in the first time slot of each frame n to n+9, the value taken by the corresponding pointer PTR has been indicated. Thus, in frame n, the first eight-bit byte whose value is 2 points to the time slot which contains the first eight-bit byte of the first AAL2 packet, or the rank 3 time slot in the group of used time slots. Also, in the n+1 frame, the first eight-bit byte whose value is 13 points to the time slot which contains the first eight-bit byte of the first AAL2 packet of the frame, or the time slot of rank 14 in the group of used time slots.

Thus, in a general manner, the value of the pointer PTR is equal to the rank within the group of the first eight-bit byte of a packet.

When a frame is partially empty and does not contain a complete AAL2 packet heading, the pointer PTR points to the first empty eight-bit byte (as in the cases of frames n+3 and n+5), in which the pointer's value is 15 and 19, respectively, to indicate the time slots of ranks 16 and 20 in the group of time slots used. On the other hand, when the frame is partially empty but contains a complete packet heading, the general case applies, so that the pointer's value is equal to the rank within the group of a packet's first eight-bit byte (such as the case of the frame+9, in which the pointer's value is 2 to indicate the rank 3 time slot in the group of time slots used).

When the frame is completely empty, the pointer's value takes on a significant value, in this case, 31 (such as the case of frame n+6). For example, the first AAL2 packet which presents itself after a frame of this type is focused on the eight-bit byte which follows the eight-bit byte containing the pointer PTR, so that the pointer PTR takes a value of zero (such as the case of frame n+7).

A zero value indicates that the AAL2 packet within the frame has its first eight-bit byte in the time slot directly following the frame's first time slot (such as in the case of the rater n+4). A value equal to 30 signifies that the frame contains 29 eight-bit bytes of a packet (all the time slots of the group of time slots used) which started in the preceding frame (such as in the case of frame n+8).

It should be noted that in conjunction with the transmission of AAL2 packets, the frames may also be used for the transmission of ATM cells. The principle of checking on the AAL2 packets is also implement for the ATM cells.

In the example illustrated above, the case under consideration was one in which the entire band is allocated for the transmission of AAL2 or ATM information, or, in other words, that all of the frame's available time slots (what has been called the group of used slots) are allocated to the transmission of AAL2 packets and ATM cells.

According to another characteristic of an embodiment of this invention, each group of time slots used may be subdivided into nonconsecutive subgroups of time slots. It is possible to segment the band reserved for the transmission of AAL2 packets and ATM cells by using only a portion of the 30 time slots TIME SLOTS. The subgroups may be of different sizes.

Figure 5:
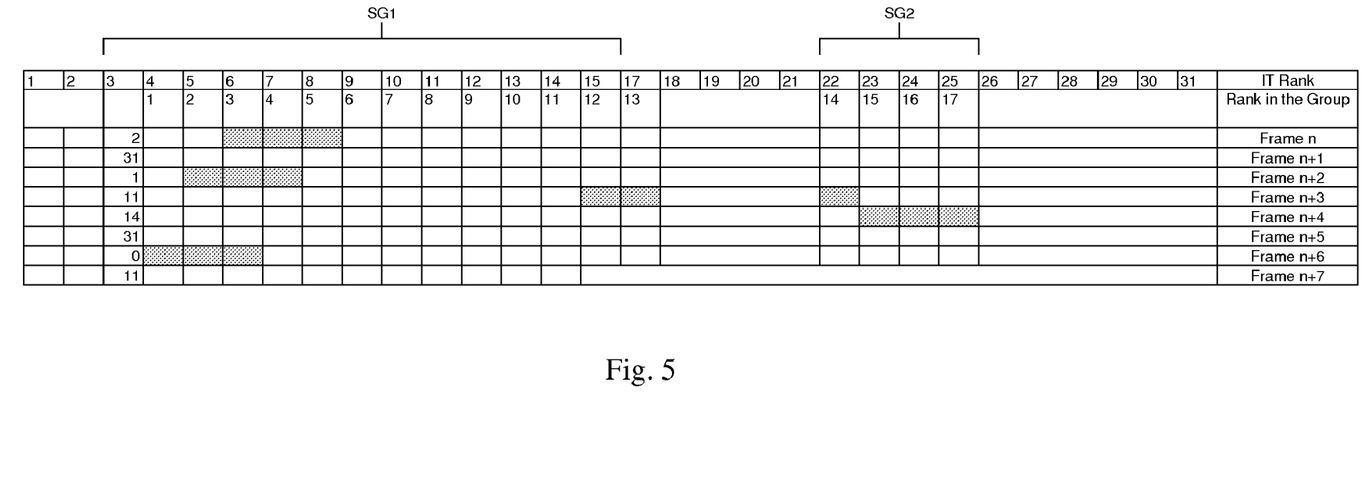
FIG. 5 is a diagram illustrating the multiplexing of AAL2 packets on E1 type frames with time-division circuits according to this invention, the group of time slots used only partially using the time slots of the above-mentioned frames.

FIG. 5 is a representation of an example of the multiplexing of AAL2 packets directly into the time slots TI of a frame of time-division circuits, in compliance with the process of an embodiment of the present invention, only using a single group of time slots subdivided into two subgroups, SG1 and SG2 of time slots TI. In this example, the time slots of the first subgroup SG1 are the time slots, the ranks of which are between 3 and 17, while the time slots of the second group, SG2, are the time slots, the ranks of which are between 22 and 25. As in FIG. 4, the headings of the three eight-bit bytes of each AAL2 packet have been grayed out. In the same manner, while all the eight-bit bytes of each AAL2 packet have been partitioned off, the eight-bit bytes not used for the transmission of AAL2 packets or ATM cells have not.

The pointing principle is identical to the one applied in FIG. 4. It may be noted that the pointer PTR is contained within the first eight-bit byte of the group of time slots allocated to the transmission of AAL2 packets and ATM cells, in this case, the first eight-bit byte of the SG1 subgroup preceding the first eight-bit byte used in the rank 4-time slot. Here, the group of time slot used is called the combination of the subgroups, SG1 and SG2. The pointer PTR indicates the time slot of the group containing the header of the first AAL2 packet contained in the frame, and its value is the rank within the group of the indicated time slots minus one (for example, in frame n+3, the time slot of the first eight-bit byte of the packet's header occupies rank 15 in the frame, but rank 12 in the group and the value of the pointer is thus 12−1=11). Insofar as the specific values allocated to this pointer are concerned, they are the same as before. Thus, the principle of the pointer is identical to the one which was previously explained with regard to FIG. 4, except for the fact that the pointer PTR cannot point at time slots which are not allocated to the transmission of AAL2 packets, such as the time slots in the frame of ranks 1 and 2, 18 to 21 and 26 to 31.

Figure 6:
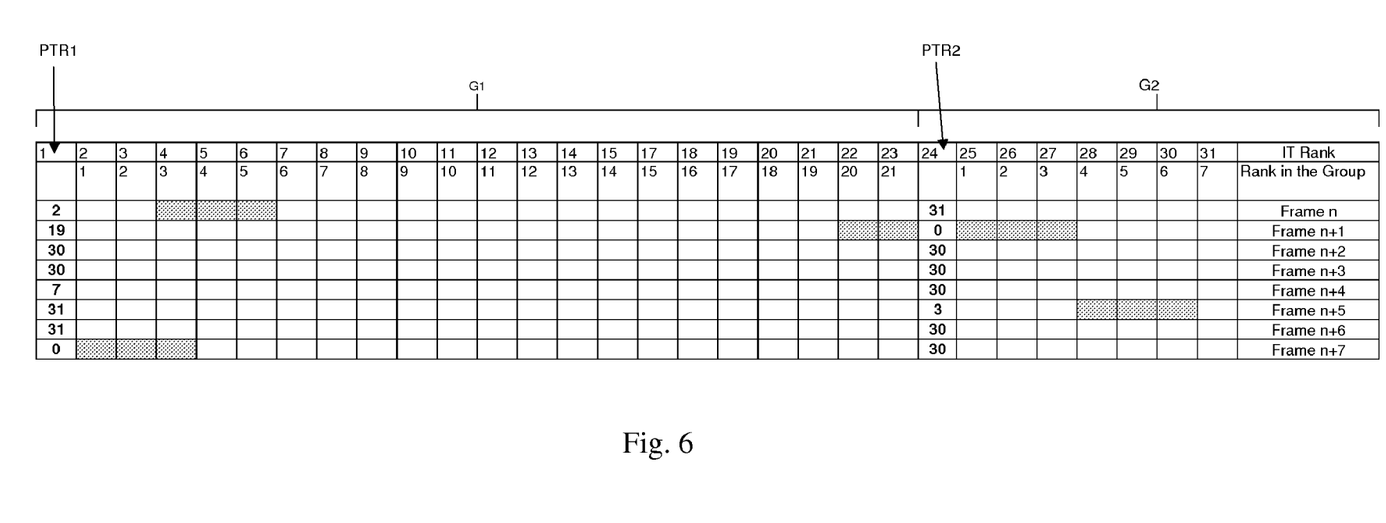
FIG. 6 is a diagram illustrating the multiplexing of AAL2 packets on E1 type frames with time-division circuits according to this invention, using two groups of time slots.

In FIG. 6, there is a representation of another example of multiplexing of AAL2 packets directly into the time slots TI of a circuit frame which have been allocated for this purpose. Here, two groups, G1 and G2 of time slots are, in reality, allocated for the transmission of AAL2 packets. These two groups, G1 and G2 occupy the totality of the time slots available for the frame, but this cannot be. Moreover, in certain embodiment modes, these groups could also be subdivided into nonconsecutive dub groups of time slots, following the example of the SG1 and SG2 subgroups represented in FIG. 5. Finally, it should be noted that the frame's available slots could be subdivided into more than two groups.

In FIG. 6, the first group, G1, covers the time slots of ranks 1 to 23, while the second group, G2, covers the time slots of ranks 24 to 31 of the frame. The first time slot of each group is used for the PTR1, PTR2 pointers. Each group, G1, G2 is independent. Because of this, the AAL2 packet of the first group, G1, of which the first eight-bit byte is located in the time slot of a rank in the frame equal to 4 (rank 3 of the group G1) of frame n stretches until the time slot in the frame of a rank equal to 23 (rank 21 of the group G1) of the same frame n, then starts again at the time slot of rank 2 of the frame n+1 (rank 1 of the group G1) to end at the time slot at rank 21 of the same frame n+1 (rank 19 of the group G1), as can be deduced from the value of 19 of its pointer PTR1. Moreover, the AAL2 packet of the second group, G2, the first eight-bit byte of which is located in the time slot of rank 25 of the frame n+1 (rank 1 of the group G2), stretches until the time slot of rank 31 of the same frame n+1 (rank 7 of the group G2), then starts again at the time slot of rank 25 of the frame n+2, stretches until the time slot of rank 31 in the same frame n+2, then starts again at the time slot of rank 25 in the frames n+3 and n+4, stretches until the time slot of rank 31 in the same frames n+3 and n+4, then starts again at the time slot of rank 25 in frame n+5 to end at the time slot of rank 27 of the same frame n+5 (rank 3 of the group G2), as may be deduced from the value of 3 of its pointer.

As in the preceding examples, a zero value of the pointers PTR1 and PTR2 indicates that the AAL2 packet was checked at its first eight-bit byte in the time slot directly following the first time slot of the group G1, G2. A value equal to 30 signifies that the time slots of the corresponding group G1, G2 contain the remaining eight-bit bytes of a packet which started in the time slots of the same group of the preceding frame. The value of 31 signifies that the time slots which belong to the corresponding G1, G2 group is empty. The first AAL2 packet which appears thereafter is based on the eight-bit byte which follows the eight-bit byte containing the pointer PTR1, PTR2, so that the pointer PTR1, PTR2 assume the zero value. Moreover, when there is no complete heading for an AAL2 packet in a group but empty eight-bit bytes, the pointer PTR1, PTR2 points to the first empty eight-bit byte.

The allocation of time slots and the partitioning of these time slots into groups and subgroups is, for example, done by the network manager in a semi-permanent fashion. This is an operation of a network dimensioning type which is not permanent, but which can be modified on the basis of various parameters, such as profiles or the nature of the traffic. The table below shows an example of a table of allocation of the time slots TI in which the frame E1 is partitioned into 2 groups of independent time slots, G1 and G2.

The crosses indicate the time slots which are reserved for the frame system. The 1's indicate an allocation to a corresponding group. With respect to the 0's, they indicate that the time slot allocated to the corresponding group.

It can be noted that the group G1 contains the time slots TI 3, 4, 5, 6, 7, 8, 9 and that the group G2 contains the time slots TI 14 to 31, excluding 16. Insofar as the time slots TI 1, 2, 10, 11, 12, 13 are concerned, they shall not be allocated to the transmission of ATM traffic.

|    | G1 | G2 |
| --- | --- | --- |
| 0  | X | X |
| 1  | 0 | 0 |
| 2  | 0 | 0 |
| 3  | 1 | 0 |
| 4  | 1 | 0 |
| 5  | 1 | 0 |
| 6  | 1 | 0 |
| 7  | 1 | 0 |
| 8  | 1 | 0 |
| 9  | 1 | 0 |
| 10 | 0 | 0 |
| 11 | 0 | 0 |
| 12 | 1 | 1 |
| 13 | 0 | 0 |
| 14 | 0 | 1 |
| 15 | 0 | 1 |
| 16 | X | X |
| 17 | 0 | 1 |
| 18 | 0 | 1 |
| 19 | 0 | 1 |

-continued

|    | G1 | G2 |
|----|----|----|
| 20 | 0  | 1  |
| 21 | 0  | 1  |
| 22 | 0  | 1  |
| 23 | 0  | 1  |
| 24 | 0  | 1  |
| 25 | 0  | 1  |
| 26 | 0  | 1  |
| 27 | 0  | 1  |
| 28 | 0  | 1  |
| 29 | 0  | 1  |
| 30 | 0  | 1  |
| 31 | 0  | 1  |

It should be noted that this allocation of time slots TI and this partitioning into groups and subgroups of the time slots are identical in the two directions of the transmission of the link by time-division circuits planned: upstream and downstream.

Generally speaking, in the case of a frame with 30 useable time slots TI, the value of the pointer PTR does not exceed the value of 31, so that 5 bits are sufficient to code it. If the pointer PTR is lodged in an eight-bit byte, 3 bits remain which may be used to code a virtual circuit address, which will then be called an AdVC address.

FIG. 7 shows the format of the check eight-bit byte which is thus made up of the pointer PTR (on five bits) and the address of the virtual circuit AdVC (on three bits). The significance of this virtual address AdVC may be found below; the value essentially depends on the virtual circuit of the transmission in question.

The 0 value of the AdVC is used to indicate that the frame is empty (does not contain any data) or that, given what has just been said, the pointer PTR is indicating an empty time slot. The 7 other remaining values of the AdVC ($2^3-1$) are respectively allocated to empty time slots. This address may also be used to differentiate two virtual circuits by the type of transmission they allow, for example, a type of virtual circuit intended for voice transmission using AAL2 packets, a type of virtual circuit intended for data transmission using AAL2 packets, a type of virtual circuit for ATM cells, etc. They may also address a reporting virtual circuit used for the transmission of control reporting information, using AAL5 packets contained in the ATM cells.

The AdVC address is associated with the AAL2 packet which is checked by the pointer PTR. Consequently, all the AAL2 packets which have headers in a same frame have the same AdVC address. They are thus transmitted over the same virtual circuit VC.

Figure 8:
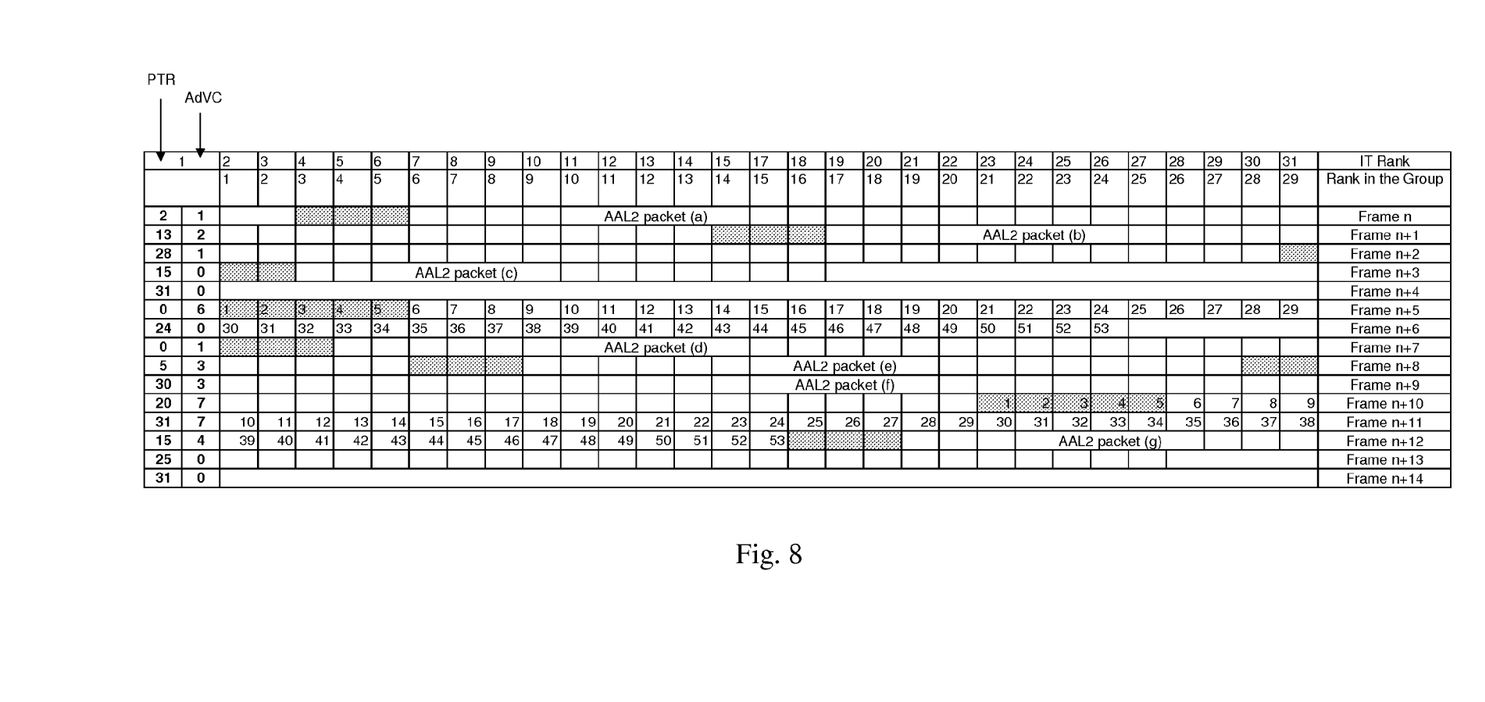
FIG. 8 is a diagram illustrating the multiplexing of AAL2 packets and ATM cells on E1 type frames with time-division circuits according to this invention, using a virtual circuit address.

FIG. 8 shows an example of the multiplexing of AAL2 packets and ATM cells in virtual circuit frames n to n+14, using the same marking principles as those used in FIG. 4; there is only one group of time slots which is used for the transmission, this group is made up of all the time slots available in the frame, and it is not subdivided into subgroups. As compared to FIG. 4, we have given, next to the pointer PTR value, the value of the virtual circuit address AdVC. This value of the virtual circuit address AdVC is, for example, assigned to virtual circuits in the manner set forth in the table below:

| AdVC | Characteristics |
|------|-----------------|
| 1 | VC - transmission of AAL2 packets (voice) |
| 2 | VC - transmission of AAL2 packets (data) |
| 3 | VC - transmission of AAL2 packets (voice) |
| 4 | VC - transmission of AAL2 packets (data) |
| 5 | Unused |
| 6 | VC - transmission of ATM cells (data on AAL5) |
| 7 | VC - reporting |

Based on this definition and the values of the AdVC address in FIG. 8, one may note that the packets (a), (c) and (d) are transmitted in the same virtual circuit, the address of which is equal to 1. The (b) packet is the only one transmitted in the virtual circuit address, the AdVC address of which is equal to 2. The (e) and (f) AAL2 packets are transmitted over the same virtual circuit, the AdVC address of which is equal to 3. With respect to the (g) packet, it is transmitted over the AdVC virtual circuit address equal to 4.

It may also be noted that the 0 values of the AdVC addresses apply to empty time slots.

There is also a representation of 2 ATM cells marked by their numbering from 1 to 53 of their eight-bit bytes, the first eight-bit bytes 1 to 5 being grayed out to represent their heading. One of the ATM cells belongs to the AdVC address channel equal to 6, while the other belongs to the AdVC address channel equal to 7.

It may also be noted that an AAL2 packet and an ATM cell may be multiplexed in the same frame, as long as the first eight-bit byte of their headings are not contained in the same frame.

In the extremity equipment which processes the AAL2 packets, either by first extracting them from ATM cells for the purpose of transmission, or by inserting them, after processing, into the ATM cells in order to transmit them, and so that the AAL2 packets and ATM cells transmitted in time-division circuits of virtual circuits VC of the virtual circuit address AdVC corresponding to the virtual circuits transmission of the ATM identifier of the virtual path VPI and virtual circuit identifier VCI, tables of matches have been set up to ensure a connection between, on the one hand, the virtual circuit identifiers which are used by the ATM cells and, on the other hand, the addresses of the virtual circuit AdVC used for the transmission in the frames of the time-division circuits. These tables are, for instance, located in this extremity processing equipment for the AAL2 packets. This table could be in the format given below, taken in conjunction with the example given above to illustrate FIG. 8.

| AdVC | VPI | VCI | Characteristics |
|------|-----|-----|-----------------|
| 1 | 0 | 200 | VC - transmission of AAL2 packets (voice) |
| 2 | 0 | 210 | VC - transmission of AAL2 packets (data) |
| 3 | 0 | 50 | VC - transmission of AAL2 packets (voice) |
| 4 | 0 | 60 | VC - transmission of AAL2 packets (data) |
| 5 | Unused | | |
| 6 | 10 | 100 | VC - transmission of ATM cells (data on AAL5) |
| 7 | 0 | 5 | VC - reporting |

Thus, the 6 AAL2 packets transmitted by the 14 frames n to n+14 are identified in the following manner:

AAL2 packet (a): AdVC=1(VPI 0, VCI 200), CID=100
AAL2 packet (b): AdVC=2(VPI 0, VCI 210), CID=80

AAL2 packet (c): AdVC=1(VPI 0, VCI 200), CID=110
AAL2 packet (d): AdVC=1(VPI 0, VCI 200), CID=100
AAL2 packet (e): AdVC=3(VPI 0, VCI 50), CID=55
AAL2 packet (f): AdVC=3(VPI 0, VCI 50), CID=28
AAL2 packet (g): AdVC=4(VPI 0, VCI 60), CID=65

The above table shows another example of the correlation table in the event that the transmission is done in two groups of time slots G1 and G2 according to the principles set forth in relation to FIG. 6.

|    | AdVC | VPI | VCI | Transmission type |
|----|------|-----|-----|-------------------|
| G1 | 1    | 0   | 100 | AAL2              |
|    | 2    | 0   | 101 | AAL2              |
|    | 3    | 0   | 102 | AAL2              |
|    | 4    | 0   | 103 | AAL2              |
|    | 5    | 0   | 200 | AAL5              |
|    | 6    | 0   | 201 | AAL5              |
|    | 7    | 0   | 202 | AAL5              |
| G2 | 1    | 1   | 100 | AAL2              |
|    | 2    | 1   | 101 | AAL2              |
|    | 7    | 1   | 200 | AAL5              |

In this example, the G1 group of time slots is allocated to the transmission of AAL2 packets over 4 address virtual circuits AdVC 1 to 4 and to the transmission of AAL5 packets over 3 address virtual circuits AdVC 5 to 7. With respect to the G2 group, it is allocated to the transmission of AAL2 packets over 2 address virtual circuits AdVC 1 and 2 and the transmission of AAL5 packets over an address virtual circuit AdVC 7. The ATM path and virtual circuit identifiers correspond to these addresses (VPI/VCI). It should be noted that in each virtual circuit used for the transmission of AAL2 packets, there can be an allocation of a maximum of 248 connections identified by a CID identifier (which has 8 bits, or 255 possible values, but 7 are reserved, thus 255−7=248).

As it has just been shown, each group of time slots used (for example, by the G1 and G2 groups) may contain a certain number of virtual circuits for the transmission of AAL2 and ATM connections, virtual circuits which are differentiated by the AdVC address. This number depends on the number of values which this address may assume—in the case of the example given above 2.sup.3−1=7. It is, however, necessary for the virtual circuits on the ATM side vary greatly from one group to the next. Thus is the example given in FIG. 8, if the virtual circuit address AdVC=2 of the G1 group is translated into VPI=0 and VCI=100, the same virtual circuit address AdVC=2 of the G2 group cannot be translated into VPI=0 VCI=100.

Among the above extremity equipment, one device may be pointed out: multiplexing/demultiplexing equipment for circuit/ATM frames, made up, one the demultiplexing side, of bi-directional ports for the transmission links by means of time-division circuit frames and, on the multiplexed side, one port, also bi-directional, for a transmission link for ATM cells.

More specifically and as an example, take a multiplexing/demultiplexing device for circuit/ATM frames having, on the one hand, 5 bi-directional ports for transmission links by means of time-division circuit frames (A, B, C, D and E) and, on the other, a port, also bi-directional, for a transmission link by means of ATM cells (M) and, below, there is an example of a correlation table for the AdVC virtual circuit addresses and the VPI/VPC identifiers for each E1 multiplex.

| Port | AdVC | VPI | VCI | Connection type |
|------|------|-----|-----|-----------------|
| A    | 1    | 10  | 100 | AAL2            |
|      | 2    | 10  | 101 | AAL2            |
|      | 7    | 10  | 5   | AAL5            |
| B    | 1    | 20  | 100 | AAL2            |
|      | 2    | 20  | 101 | AAL2            |
|      | 7    | 20  | 5   | AAL5            |
| C    | 1    | 30  | 100 | AAL2            |
|      | 2    | 30  | 101 | AAL2            |
|      | 7    | 30  | 5   | AAL5            |
| D    | 7    | 40  | 5   | AAL5            |
| E    | 1    | 50  | 100 | AAL2            |
|      | 7    | 50  | 5   | AAL5            |

Below is an example of the switching tables of the AAL2 connections in the multiplexer/demultiplexer given as an example above.

| Cx | Port | AdVC | CID | Port | VPI | VCI | CID |
|----|------|------|-----|------|-----|-----|-----|
| 1  | A    | 1    | 40  | M    | 10  | 100 | 40  |
| 2  | A    | 1    | 41  | M    | 10  | 100 | 41  |
| 3  | A    | 1    | 42  | M    | 10  | 100 | 42  |
| 4  | A    | 2    | 40  | M    | 10  | 101 | 40  |
| 5  | A    | 2    | 50  | M    | 10  | 101 | 50  |
| 6  | A    | 2    | 60  | M    | 10  | 101 | 60  |
| 7  | A    | 2    | 70  | M    | 10  | 101 | 70  |
| 8  | B    | 1    | 30  | M    | 20  | 100 | 30  |
| 9  | B    | 2    | 30  | M    | 20  | 101 | 30  |
| 10 | B    | 2    | 31  | M    | 20  | 101 | 31  |
| 11 | D    | 2    | 32  | M    | 20  | 101 | 32  |
| 12 | C    | 1    | 40  | M    | 30  | 100 | 40  |
| 13 | C    | 1    | 41  | M    | 30  | 101 | 41  |
| 14 | E    | 1    | 100 | M    | 50  | 100 | 100 |
| 15 | E    | 1    | 101 | M    | 50  | 100 | 101 |
| 16 | E    | 1    | 102 | M    | 50  | 100 | 102 |
| 17 | E    | 1    | 103 | M    | 50  | 100 | 103 |

The absence of concentration may be noted. In the multiplexer's M multiplex, there may be found all the ATM connections present over all the E1 connections, i.e., 7 virtual circuits for the transmission of AAL2 and 5 virtual circuit packets and 5 virtual circuits for transmission of AAL5 type packets.

Above is another example of the correspondence between the addresses of the AdVC virtual circuits and the VPI/VCI identifiers for each B1 multiplex resulting in the above multiplexer/demultiplexer.

| Port | AdVC | VPI | VCI | Connection type |
|------|------|-----|-----|-----------------|
| A    | 1    | 0   | 100 | AAL2            |
|      | 2    | 0   | 101 | AAL2            |
|      | 7    | 10  | 5   | AAL5            |
| B    | 1    | 0   | 100 | AAL2            |
|      | 2    | 0   | 101 | AAL2            |
|      | 7    | 20  | 5   | AAL5            |
| C    | 1    | 0   | 100 | AAL2            |
|      | 2    | 0   | 101 | AAL2            |
|      | 7    | 30  | 5   | AAL5            |
| D    | 7    | 40  | 5   | AAL5            |
| E    | 1    | 0   | 100 | AAL2            |
|      | 7    | 50  | 5   | AAL5            |

The above table represent one example of the AAL2 connection switching and correlation table. It should be noted that the identifiers of the CID connections must be translated.

This table is updated during the establishment phase of the AAL2 connections. The concentration equipment carries out switching functions for AAL2 packets, and, on this basis, must manage the AAL2 reporting protocol (IUT Q.2630.2 recommendation).

| Cx | Port | AdVC | CID | Port | VPI | VCI | CID |
|---|---|---|---|---|---|---|---|
| 1 | A | 1 | 40 | M | 0 | 100 | 200 |
| 2 | A | 1 | 41 | M | 0 | 100 | 201 |
| 3 | A | 1 | 42 | M | 0 | 100 | 202 |
| 4 | A | 2 | 40 | M | 0 | 101 | 200 |
| 5 | A | 2 | 50 | M | 0 | 101 | 201 |
| 6 | A | 2 | 60 | M | 0 | 101 | 202 |
| 7 | A | 2 | 70 | M | 0 | 101 | 203 |
| 8 | B | 1 | 30 | M | 0 | 100 | 203 |
| 9 | B | 2 | 30 | M | 0 | 101 | 204 |
| 10 | B | 2 | 31 | M | 0 | 101 | 205 |
| 11 | B | 2 | 32 | M | 0 | 101 | 206 |
| 12 | C | 1 | 40 | M | 0 | 100 | 204 |
| 13 | C | 1 | 41 | M | 0 | 101 | 207 |
| 14 | E | 1 | 100 | M | 0 | 100 | 205 |
| 15 | E | 1 | 101 | M | 0 | 100 | 206 |
| 16 | E | 1 | 102 | M | 0 | 100 | 207 |
| 17 | E | 1 | 103 | M | 0 | 100 | 208 |

In this configuration, the traffic flows are, for instance, concentrated by the types of service quality, for example, according to real time constraints or constraints related to loss rates. It is deemed, for example, that for ports A, B and C, an AAL2 channel is reserved for flows with real time constraints and an AAL2 channel is reserved for flows without time-division constraints. Port E carries a single flow without time constraints. These flows are concentrated on the M output on 2 transmission virtual circuits. For example, the virtual circuit (VPI=0, VCI=100) is reserved for real time flows and the virtual circuit (VPI=0, VCI=101) for flows which are not in real time. This operations provides a statistical gain by ensuring optimal filling of the ATM cells to be transmitted.

Another solution would consist of concentrating all the flows into a single virtual circuit which would provide an even greater gain. The converse is that the virtual circuit VC must provide a service quality SQ which can satisfy both the constraints associated with the transmission of voice traffic and data traffic, that is to say, with strong real time constraints and a low loss rate.

Among the above-mentioned extremity equipment, one can also mention a multiplexer/demultiplexer device containing, on the demultiplexed side, bi-directional ports for transmission connections by means of time-division frames and, on the multiplexed side, a port, also bi-directional and for a transmission link by means of time-division circuit frames. More specifically, and as an example, multiplexing/demultiplexing equipment is now under consideration, with, on the multiplexed side, three ports (A, B, C) for transmission links using virtual circuit frames for AAL2 traffic and, on the demultiplexed side, a port E for a transmission link by means of virtual circuit frames. Obviously, this is only possible if the number of time slots TI used for the three links on the demultiplexed side is less than or equal to the number of time slots TI available on the single link on the multiplexed side. This type of equipment manages link ports for transmissions using virtual circuit frames but internally, it processes AAl2 packet-type data units.

An example of the correlation table of AdVC virtual circuit addresses may be found below.

| Port for demultiplexed links | AdVC | Port for links multiplexed | AdVC | Connection type |
|---|---|---|---|---|
| A | 1 | E | 1 | AAL2 |
| A | 2 | E | 2 | AAL2 |
| A | 7 | E | 7 | AAL5 |
| B | 1 | E | 3 | AAL2 |
| B | 2 | E | 4 | AAL2 |
| B | 7 | E | 6 | AAL5 |
| C | 1 | E | 5 | AAL2 |

Below is a description of the advantage of the principle of an embodiment of this invention to be used for the transmission of AAL2 packets by means of transmission links using virtual circuit frames, of type E1 for example, as compared to the technique of transmission by means of ATM cells using transmission links by means of virtual circuit frames, type E1, for example. The following calculations are based on hypotheses which are intentionally simple in a UTRAN access network configuration on the hub interface which connects a Node B base station to an RNC mobile network controller. These hypotheses are as follows:

1) These are data blocks of 31 eight-bit bytes emanating from AMR coded voice communications at a flow rate of 12.2 kb/s with time slots of 20 ms. The resulting AAL2 packet is 42 eight-bit bytes long, the 9 additional eight-bit bytes being made up of 3 eight-bit bytes of header and 6 eight-bit bytes of encapsulation of the layers of radio protocol. More specifically, this concerns the upstream direction. In the downstream direction, the final AAL2 packet would only amount to 40 eight-bit bytes.

2) The E1 frame is 100% occupied: the 30 time slots TI are used in a single group (a single marking slot).

First case: the AAL2 packets are inserted in the E1 frame consecutively, as shown in FIG. 4. The number of frames R needed to transmit M packets of 42 eight-bit bytes is equal to:

$$R = M.\text{times}.42/(30-1)$$

It should be noted that each E1 frame only contains 29 useable eight-bit bytes (30 eight-bit byte minus one marking eight-bit byte).

As an example, to transmit 58 AAL2 packets, 84 frames would be needed. The output is (58.times.42)/(84.times.30), or 97%. Taking into account the 3 eight-bit bytes of the headings of the AAL2 packets, the output decreases to 90%.

Second case: the same packets are inserted into ATM cells with 4 eight-bit bytes of padding. There is thus only one mini cell of 42 eight-bit bytes per ATM cell. The number of frames R needed to transmit C ATM cells (or M 42 eight-bit byte minicells) is equal to:

$$R = C.\text{times}.53/30, \text{ each E1 contains 30 useable eight-bit bytes.}$$

To transmit 58 minicells, 102 complete frames and 14 time slots at the last frame are needed. The output is (58.times.42)/102.times.30) or 80%. If the 3 eight-bit byte headers of the AAL2 packets are taken into consideration, the output decreases to 74%.

Third case: the same AAL2 packets are inserted into the ATM cells, but with overlapping between frames but without eight-bit byte padding. The number of frames needed to transmit C cells is equal to R=C.times.53/30. To transmit M 42 eight-bit byte minicells, C cells of 47 eight-bit bytes are needed, or C=M.times.42/47. The number of frames needed to transmit M AAL2 packets of 42 eight-bit bytes is thus equal to T=M.times.(42.times.53)/(30.times.47). Thus if M=58, the number of frames R equals 91, to be compared with 102 frames from the second case above, The output is equal to (58.times.42)/(91.times.30) or 89%. It decreases to 83% if one takes the eight-bit bytes of the header into consideration.

With respect to the ATM transmission on E1, cases 2 and 3 represent extreme configurations. The reality is situated somewhere between these two cases. Although the case involving transmission of AAL2 packets without time slots TI is a favorable case, it nevertheless remains more efficient than the transmission of AAL2 packets by ATM on E1 in high traffic situations.

In the preceding examples, a 12.2 kb/s output was selected. It should be noted that the AMR coding provides for lower outputs. The length of the corresponding packets is shorter. The frequency of eight-bit byte padding should thus be more significant with respect to the output loss. As an indication, the table below describes the length of the AAL2 packets for the various output values for AMR coding. The silences are the subject of the transmission of AAL2 packets of 13 eight-bit bytes (5+headers). The difference of 2 eight-bit bytes between upstream and downstream should be noted.

| AMR coding outputs (kb/s) | Size of AAL2 packets on upstream/downstream Iub interface | Size of AAL2 packets on upstream/downstream Iu interface | TTI |
| --- | --- | --- | --- |
| 12.2 | 42/40 | 39/57 | 20 ms |
| 10.2 | 37/35 | 34/32 | 20 ms |
| 7.95 | 32/30 | 29/27 | 20 ms |
| 7.4 | 30/28 | 27/25 | 20 ms |
| 6.7 | 29/27 | 26/24 | 20 ms |
| 5.9 | 27/25 | 24/22 | 20 ms |
| 5.15 | 25/23 | 22/20 | 20 ms |
| 4.75 | 24/22 | 21/19 | 20 ms |
| Silence | 13/11 | 10/8 | 80 ms |

An aspect of this disclosure is to propose a transmission method for packets of variable length, as has been described above, but also possibly for cells, such as ATM cells, in a frame of time-division circuits, allowing the maximally efficient use of the transmission media by means of virtual circuit frames, E1/T1 type for example, which has a relatively weak bandwidth (1.920 Mb/s in this case). One can thus foresee a transmission process for variable length packets such as AAL2 packets and, conceivably, cells such as ATM cells in time-division circuit frames such as the E1/T1 frames, each divided into a number of time slots, each one occupied by an eight-bit byte.

What is claimed is:

1. A method comprising:
    transmitting data belonging to an asynchronous transfer mode (ATM) connection in a time-division frame divided into a plurality of time slots, the data having a type being one of a variable length ATM Adaption Layer type 2 (AAL2) packet or an ATM cell, each time slot taking an eight-bit byte, consecutive eight-bit bytes of said data being located in consecutive time slots of at least one group of time slots of said frames, a first eight-bit byte of said data being placed at a time slot marked by a pointer equal to a rank of said time slot within said corresponding group of time slots minus one;
    selecting a virtual circuit address based on the type of the data, the virtual circuit address defining a virtual circuit for the transmission of said data marked by said pointer within the time slots of the frame;
    associating said pointer with the virtual circuit address, said virtual circuit address and pointer occupying a specific time slot of said corresponding group of time slots that is distinct from the time slots in which the data is transmitted;
    transmitting said specific time slot;
    transmitting said data marked by said pointer via said virtual circuit; and
    transmitting, via said virtual circuit, consecutive data of the connection within the time slots of a frame belonging to the same group of time slots as said data pointed to by said pointer.

2. The method according to claim 1 wherein the pointer's value is equal to the rank, in said corresponding group of time slots, of the first eight-bit byte of a corresponding header minus one, or, when said frame is partially empty, and said frame does not contain any headers or complete headers of the data, at the rank, in said corresponding group of time slots, of a first empty eight-bit byte minus one.

3. The method according to claim 2, wherein the value of the pointer is zero when the first eight-bit byte of said data is located in a time slot that directly follows the specific time slot allocated to said pointer.

4. The method according to claim 2, wherein the value of the pointer is equal to a specific value when all the time slots of said corresponding group of time slots are empty.

5. The method according to claim 4, wherein said specific value is the number of time slots contained in each frame.

6. The method according to claim 2, wherein said value of the pointer is equal to a specific value when all the group's time slots are occupied by the eight-bit bytes of the data, of which a header is located in a preceding frame.

7. The method according to claim 6, wherein said specific value is the number of time slots contained in each frame minus one.

8. The method according to claim 1, wherein for the transmission of said data, each frame contains several groups of time slots.

9. The method according to claim 1, wherein, for the transmission of said data, each frame has a unique group of time slots which occupies all the available time slots of each frame.

10. The method according to claim 1, wherein, for the transmission of said data, each frame has a unique group of time slots which only partially occupies the available time slots of each frame.

11. The method according to claim 1, wherein each group is subdivided into nonconsecutive subgroups of time slots.

12. The method according to claim 1, wherein said time division circuit frames are E1/T1 frames.

13. Transmission extremity link equipment comprising:
    means for transmitting or receiving data according to an asynchronous transfer mode (ATM) connection in a time-division frame divided into a plurality of time slots, the data having a type being one of a variable length ATM Adaption Layer type 2 (AAL2) packet or an ATM cell, each time slot taking an eight-bit byte, consecutive eight-bit bytes of said data being located in consecutive time slots of at least one group of time slots of said frames, a first eight-bit byte of said data being placed at a time slot marked by a pointer having a value that is based on a rank of said time slot within said corresponding group of time slots, wherein a specific time slot of said group of time slots, which is distinct from the time slots in which the data is transmitted, comprises the pointer and a virtual circuit address associated with the pointer, which defines a virtual circuit in which the data is transmitted or received within the time slots of the frame;

means for processing said data in relation with ATM cells that are identified by a virtual path identifier and a virtual circuit identifier and are received or transmitted by the link equipment; and a correlation table between of the virtual circuit address of said data, and a virtual path and a virtual circuit identifiers of said cells, which defines a connection between the virtual circuit defined by the virtual circuit address of the data and a virtual circuit identified by the virtual circuit identifiers of the ATM cells.

14. Transmission extremity link equipment according to claim 13, wherein said equipment comprises a multiplexer/demultiplexer containing, on a demultiplexed side, a number of ports for transmission links by the virtual circuit defined by the virtual circuit address and, on a multiplexed side, a port for transmission links by the ATM cells in the virtual circuit identified by the virtual circuit identifier.

15. Transmission extremity link equipment according to claim 14, wherein, on the demultiplexed side, the multiplexer/demultiplexer comprises a number of bi-directional ports for transmission links by the virtual circuit defined by the virtual circuit address and, on the multiplexed side, a bi-directional port for transmission links by the virtual circuit identified by the virtual circuit identifier.

16. Transmission extremity link equipment according to claim 14, wherein said equipment comprises means of translating the virtual circuit addresses borne by the data in order to be able to concentrate traffic flow present at the ports on the multiplexed side.

17. Transmission extremity link equipment according to claim 13, wherein the virtual path identifier and the virtual circuit identifier are allocated according to the type of data.

18. The transmission extremity link equipment of claim 13, wherein the pointer value is equal to a rank of said time slot within said group of corresponding time slots minus one.

19. A method comprising:

generating, with a device, time-division frames of data belonging to an asynchronous transfer mode (ATM) connection, each frame being divided into a number of time slots, the data having a type being one of a variable length ATM Adaption Layer type 2 (AAL2) packet or an ATM cell, each time slot taking an eight-bit byte, consecutive eight-bit bytes of of said data being located in consecutive time slots of at least one group of the time slots of said frame, a first eight-bit byte of said data being placed at a time slot marked by a pointer having a value that is based on a rank of said time slot within said group of corresponding time slots, associating the pointer with a virtual circuit address, which is based on the type of data and defines a virtual circuit for transmission of said data, marked by said pointer, within the time slots of the frame, said virtual circuit address and pointer occupying a specific time slot of said corresponding group of time slots that is distinct from the time slots in which the data is transmitted; and transmitting the frames from the device.

20. The method according to claim 19, wherein said time division circuit frames are E1/T1 frames.

21. The method of claim 19, wherein the pointer value is equal to a rank of said time slot within said group of corresponding time slots minus one.

* * * * *

UNITED STATES PATENT AND TRADEMARK OFFICE
CERTIFICATE OF CORRECTION

| | | |
|---|---|---|
| PATENT NO. | : 7,733,877 B2 | Page 1 of 1 |
| APPLICATION NO. | : 10/480716 | |
| DATED | : June 8, 2010 | |
| INVENTOR(S) | : Quinquis et al. | |

It is certified that error appears in the above-identified patent and that said Letters Patent is hereby corrected as shown below:

In the claims:

Column 16:

Claim 13, line 67, delete "address associated" and insert --address that is based on the type of data associated--.

Column 17:

Claim 13, line 4, delete "in relation with ATM cells".

Claim 13, line 9, delete "a virtual circuit" and insert --virtual circuit--.

Claim 13, line 10, delete "of said cells".

Claim 13, line 13, delete "of the ATM cells".

Signed and Sealed this
Thirtieth Day of June, 2015

Michelle K. Lee
*Director of the United States Patent and Trademark Office*